(12) United States Patent
Duncan

(10) Patent No.: US 6,637,179 B2
(45) Date of Patent: Oct. 28, 2003

(54) INERTIAL SYSTEM FOR DETECTING FOREIGN OBJECTS BETWEEN CONTRA-ROTATING ROLLS

(75) Inventor: Wayne Duncan, Eckville (CA)

(73) Assignee: Kasha Farm Supplies Ltd., Eckville (CA)

( * ) Notice: Subject to any disclaimer, the term of this patent is extended or adjusted under 35 U.S.C. 154(b) by 0 days.

(21) Appl. No.: 10/022,273

(22) Filed: Dec. 20, 2001

(65) Prior Publication Data
US 2003/0115846 A1 Jun. 26, 2003

(51) Int. Cl.$^7$ ............................................... A01D 75/28
(52) U.S. Cl. ............................. 56/10.2 J; 460/2; 460/3
(58) Field of Search .................... 56/10.2 J, 10.2 R, 56/295, 296, 257, DIG. 15, DIG. 24; 460/2, 3; 340/684, 503

(56) References Cited

U.S. PATENT DOCUMENTS

| 3,559,805 A | 2/1971 | Cragg |
| 3,675,660 A | 7/1972 | Goridat |
| 3,805,798 A | 4/1974 | Girodat |
| 3,990,218 A | 11/1976 | Graeber |
| 4,193,248 A | * 3/1980 | Gilleman ..................... 460/3 |
| 4,195,644 A | 4/1980 | Ryczek |
| 4,294,062 A | 10/1981 | Seymour |
| 4,335,563 A | 6/1982 | Rice et al. |
| 4,335,564 A | 6/1982 | Knepper |
| 4,353,199 A | 10/1982 | Chow et al. |
| 4,433,528 A | 2/1984 | Bohman |
| 4,531,118 A | * 7/1985 | Beams ........................ 340/684 |
| 4,776,154 A | * 10/1988 | Weiss et al. ............... 56/10.2 J |
| 5,092,818 A | 3/1992 | Bohman et al. |
| 5,901,535 A | 5/1999 | Duckinghaus et al. |
| 6,318,056 B1 | * 11/2001 | Rauch et al. .............. 56/10.2 J |
| 6,324,822 B1 | * 12/2001 | Oliva ........................ 56/10.2 J |

OTHER PUBLICATIONS

Shinners et al., Measuring Mass–Flow Rate on Forage Cutting Equipment, Article Review, Nov. 13, 2000, 2pp, http://www.auburn.edu/academic/classes/bsen/3260–001/eric/article3.html (as cached by google.com).

Martel et al., Sensors to measure mass–flow–rate through a forage harvester, Jul.–Sep. 2000, 7pp, Canadian Agricultural Engineering, vol. 42, No. 3 pp. 123–129.

Greenawalt, Eric, Development of a Yield and Moisture Sensor for the Implementation of Precision Farming in Forage Harvesting, M.S. Research Proposal, Date unknown (1998 or 1999), 18pp, www.personal.psu.edu/staff/e/b/ebg109/work.htm.

* cited by examiner

Primary Examiner—Árpád Fábián Kovács
(74) Attorney, Agent, or Firm—Sean W. Goodwin

(57) ABSTRACT

A foreign object detector comprises an inertial sensor mounted for displacement with one of the displaceable rolls in the feed mechanism of a forage harvester. When a foreign object is forced through the rolls, the acceleration of the rolls' displacement exceeds a predetermined threshold and the detector stops the feed mechanism. Preferably, the detector's sensor is a microswitch having an inertially-actuable lever and which is mounted for displacement with the upper feed roll. The detector's circuitry ties into existing metal detector circuitry.

7 Claims, 9 Drawing Sheets

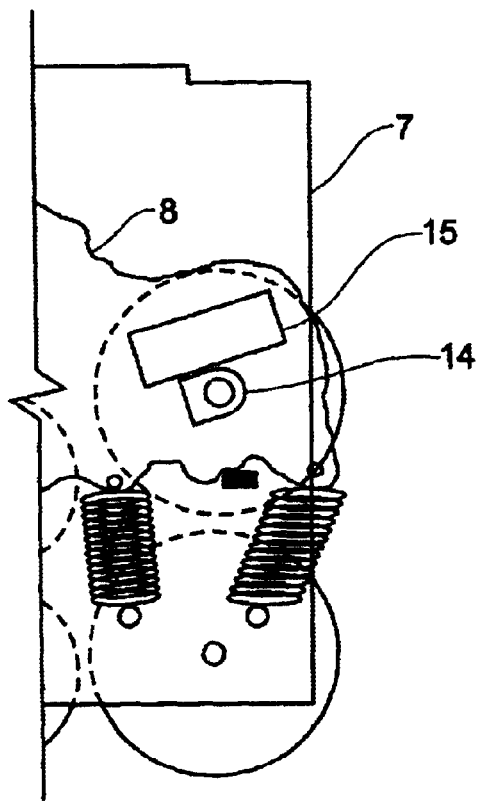 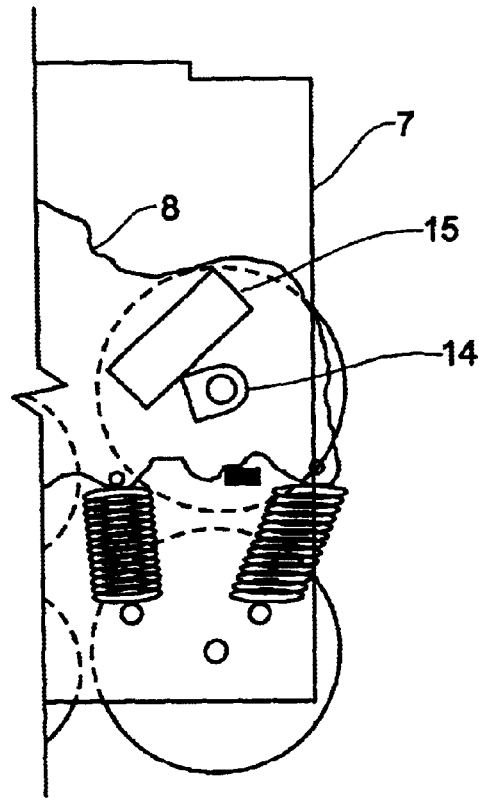

INERTIAL SYSTEM FOR DETECTING FOREIGN OBJECTS BETWEEN CONTRA-ROTATING ROLLS

FIELD OF THE INVENTION

The present invention relates generally to agricultural harvesting machines and more specifically to apparatus for detecting the presence of foreign objects, such as stones, within the crop material processed by these harvesters.

BACKGROUND OF THE INVENTION

Generally forage harvesters include a crop harvesting header mounted at the forward end thereof to initiate the crop harvesting process. The header consolidates the harvested crop and presents it to a centrally located feed mechanism comprising of one or more pairs of parallel and opposing, counter-rotating rolls such as feed rolls and conditioning rolls.

The paired feed rolls form the crop into a mat by forcing it into the space, or nip, between the rolls and then compresses the crop. Generally one roll, of the pair of feed rolls, displaces relative to the other in response to changing crop density and thereby passively adjusts the spacing of the nip; the displaceable roll being held in opposition to the stationary roll by springs, coils or similar mechanisms.

The mat of crop is then delivered across a shear bar where it is cut into short lengths by the blades of a rotating cutting drum. The cutting drum rotates past the shear bar at speeds of 1000–1200 revolutions per minute or more. Typically, feed roll speed can be adjusted depending on the crop conditions and the desired chop length, with faster feed roll speeds resulting in a longer chop length.

To avoid damage, it has been an objective to eliminate foreign matter from the flow of harvested crop before it reaches the rotating cutting drum. Foreign matter includes stones, wood and other debris which can damage the cutting drum or the blades mounted on the cutting drum. The cost of repairing a damaged cutting drum can be in the tens of thousands of dollars and result in significant down time. Furthermore, if any of the blades are dislodged by the impact with the foreign matter, these blades can be thrown into the upstream parts of the harvester, such as the accelerator/blower, and create even more damage. Therefore, it is desirable to be able to sense the presence of foreign objects in the crop material passing through the harvesting machine, and stop the transport of the crop material when a foreign object is sensed, thereby preventing the foreign object from reaching the cutting drum.

The presence of foreign objects in harvested crop material has long been recognized as a problem. Generally speaking, two types of foreign object detectors are known in the art. One type, generally referred to as metal detectors, detects ferrous objects and stops the crop feed mechanism upon detection of such an object. U.S. Pat. No. 4,433,528 to Bohman discloses such a metal detector mounted in a hollow feed roll which includes a magnetically sensitive system to detect the presence of ferrous material in the crop.

A problem addressed by these metal detection devices is where the crop is destined for use as an animal feed and the subsequent ingestion of metal by animals results in a condition known as "hardware disease". Often the metal material detected is stray fencing wire or fencing staples which are no direct threat to the cutting drum and are simply processed along with the rest of the crop. Larger metal pieces, such as tools dropped by accident on the field, would cause damage to the cutting drum, and hence these metal detectors do provide a limited form of protection against such damage.

One major disadvantage of such a detection system is that many foreign objects are non-ferrous, including rocks and wood pieces, and thus are not detected. This is not surprising as these detectors were designed to address the "hardware disease" problem rather than to prevent damage to the cutting drum. Overall, however, rocks are a much more common occurrence in the field than are stray metal pieces.

A second type of detector, generally referred to as a stone detector, detects stones and other hard objects including metal objects. Stone detectors may take many forms and be located at various positions in the harvesting machine. For example, in U.S. Pat. No. 3,990,218 to Graeber a pressure-sensitive switch, attached in parallel behind the sickle bar of the harvester's header, senses rocks and other foreign objects by virtue of their greater relative weight compared to that of the crop material.

The primary disadvantage of this detection device is that it would only work on a harvesting machine in which the header comprises a cutting device, such as a sickle or cutter bar. However, most forage harvesters operate using a pick-up to gather previously severed crop, because efficiencies can be realized by using a separate swather machine to cut the crop quickly and then harvesting the cut swath with a forage harvester. Hence a forage harvester with a pick-up header is unable to use such a device because it lacks a sickle bar. Furthermore, the relative weight of foreign objects such as wood pieces may not be sufficient to trigger the pressure-sensitive switch and such foreign objects may also be bounced or thrown over top of the pressure sensitive switch depending on how they impact the sickle bar.

A more common form of stone detector is an acoustically activated detector. For instance, U.S. Pat. No. 4,353,199 by Chow et al., discloses a detector mounted inside a hollow feed roll. The detector in this device senses acoustical vibrations set up in the feed roll as a result of the impact of hard objects on the feed roll. These acoustically triggered systems are theoretically capable of detecting both ferrous and non-ferrous foreign objects, but have the severe limitation in that foreign objects are often embedded within the crop mat and therefore create insufficient noise to trigger the system as they pass through the harvester. Furthermore, these types of detectors can not be easily retrofitted into forage harvesters because they require the disassembly of the feed roll mechanism and are complex in design.

Even combining a metal detector with an acoustic detector in the same feed roll, as in U.S. Pat. No. 5,092,818 to Bohman et al., does not provide any particular advantage as embedded, non-ferrous, foreign objects do not trigger either of these types of detectors.

Ideally, a device designed to detect foreign objects in crop material would be able to detect a wide range of foreign object types, including those embedded inside the crop material, be capable of functioning on a range of forage harvesters including those with pick-up units, and be easily retrofitted into those harvesters without an existing foreign object detector.

SUMMARY OF THE INVENTION

The foreign object detector of the present invention includes an inertial sensor mounted in the feed mechanism of a forage harvester and additional circuitry so as to shut down the feed mechanism if a foreign object is detected. The feed mechanism of a harvester typically comprises a pair of parallel counter-rotating feed rolls which compress the crop into a mat by forcing it into the space, or nip, between the rolls. Generally one roll, of the pair of feed rolls, is displaceable relative to the other in response to changing crop density and thereby passively adjusts the spacing of the nip; the displaceable roll being held in opposition to the stationary roll by springs, coils or similar biasing mechanisms.

The detector's inertial sensor is mounted for displacement with at least one of the rolls of a pair of counter-rotating parallel feed rolls in the feed mechanism of a forage harvester. The sensor is capable of sensing acceleration. When the sensor's acceleration exceeds a predetermined threshold, a signal is generated or emitted which causes the feed mechanism to stop. Preferably the sensor is a switch with an inertially-actuated lever, or the sensor is an accelerometer coupled with circuitry to compare the sensed acceleration against a predetermined acceleration threshold.

Should a rock, or other substantially non-compressible object, embedded in the normally compressible crop mat, be forced through the rolls the displaceable roll will experience a rapid displacement relative to its previous position and hence undergo a much greater acceleration than that experienced during normal operations. Such an acceleration exceeds the predetermined threshold, signaling the detector to stop the feed mechanism.

In one embodiment, the detector comprises a microswitch sensor and additional circuitry. The microswitch sensor is mounted for displacement with the upper, displaceable, feed roll. The additional circuitry ties into existing metal detector circuitry, in series, so that either objects or metal can trigger the circuit to stop the feed mechanism. When a foreign object causes the upper feed roll to quickly accelerate upward, the microswitch sensor is tripped and the additional circuitry interrupts the sensing wire of the metal detector, thereby simulating the presence of a metal object, and signaling the metal detector to stop the feed mechanism.

BRIEF DESCRIPTION OF THE DRAWINGS

FIGS. 5a and 5b are side views of the sensor mounted on the wedge bolt of the feed roll shaft in more and less sensitive configurations respectively;

DETAILED DESCRIPTION OF THE PREFERRED EMBODIMENTS

Figure 1:
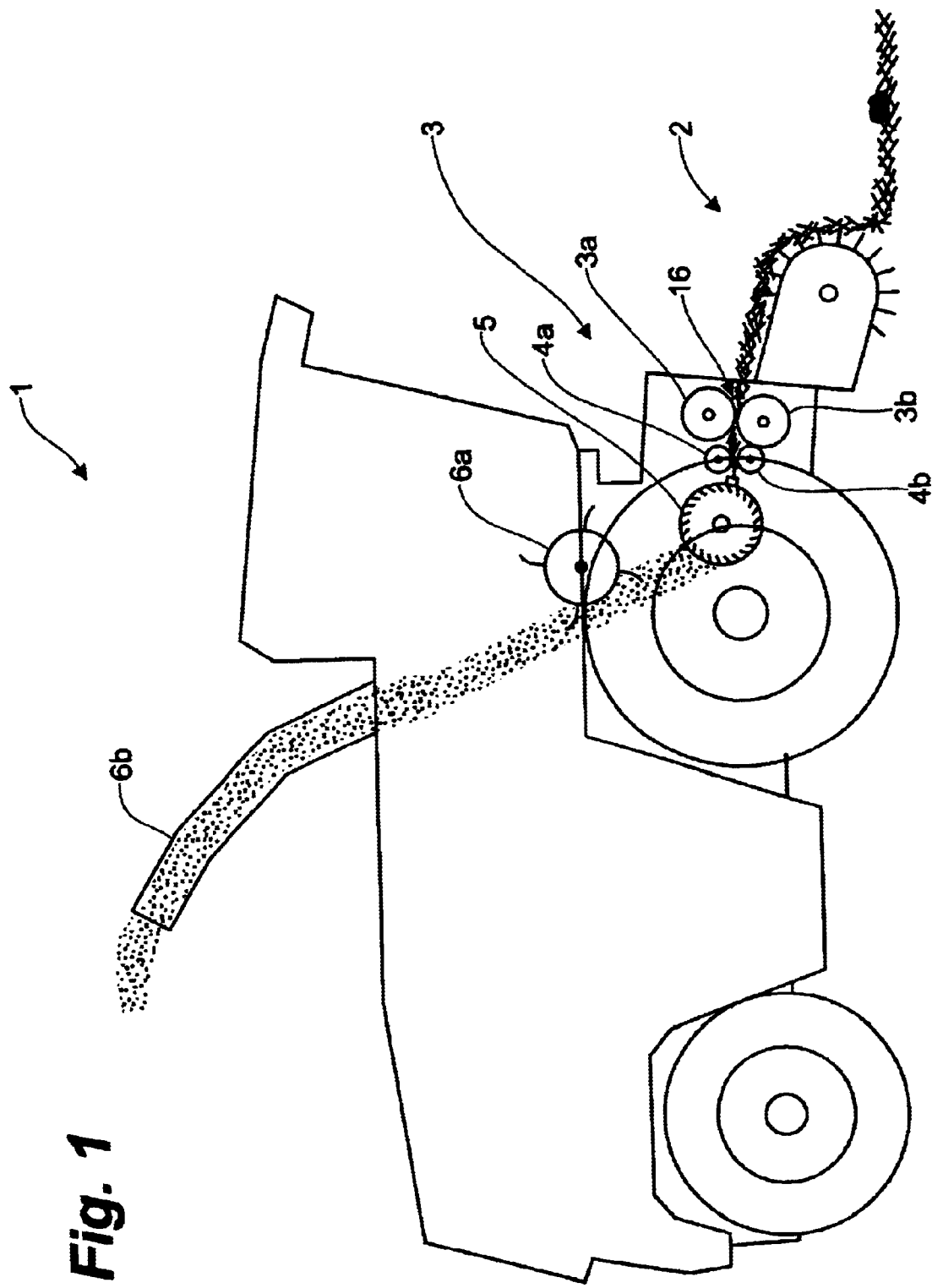
FIG. 1 is a schematic side view of a forage harvester.

Having reference to FIG. 1, a harvesting machine 1 is shown with a header 2 attachment. The particular harvesting machine 1 of FIG. 1 is a self-propelled forage harvester with a pick-up header 2, but it could also be any of a variety of harvesting machines, for example a tractor-pulled forage harvester, or a self-propelled forage harvester with a corn header. The header 2 picks up the crop to be harvested from the field and presents it to a feed mechanism 3.

The feed mechanism 3 comprises staged sets of counter-rotating parallel and opposing rollers including co-operating upper and lower feed rolls 3a, 3b and co-operating upper and lower 4a, 4b compression rolls. A space, or nip 16, is thus formed between each set of counter-rotating parallel rolls. The feed mechanism 3 forms the crop into a mat and delivers it across a shear bar (not shown) where it is chopped into short lengths by the blades of a cutting drum 5.

The chopped crop may also be processed by a conditioning device (not shown), such as a corn cracker, and is finally accelerated by a blower or accelerator 6a so as to ultimately be ejected into an accompanying transport vehicle through a discharge spout 6b.

Figure 2:
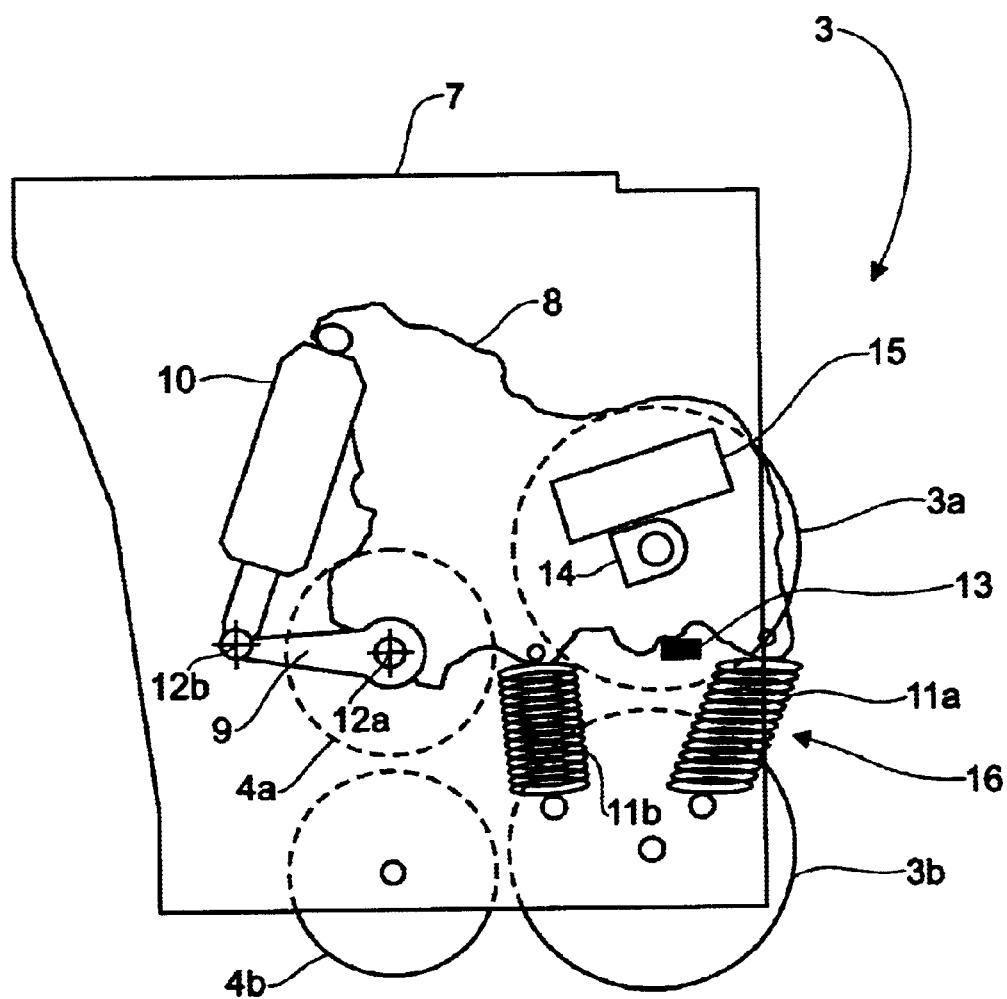
FIG. 2 is a side view of the feed roll housing with the upper front feed roll in the lowest vertical position.
Figure 3:
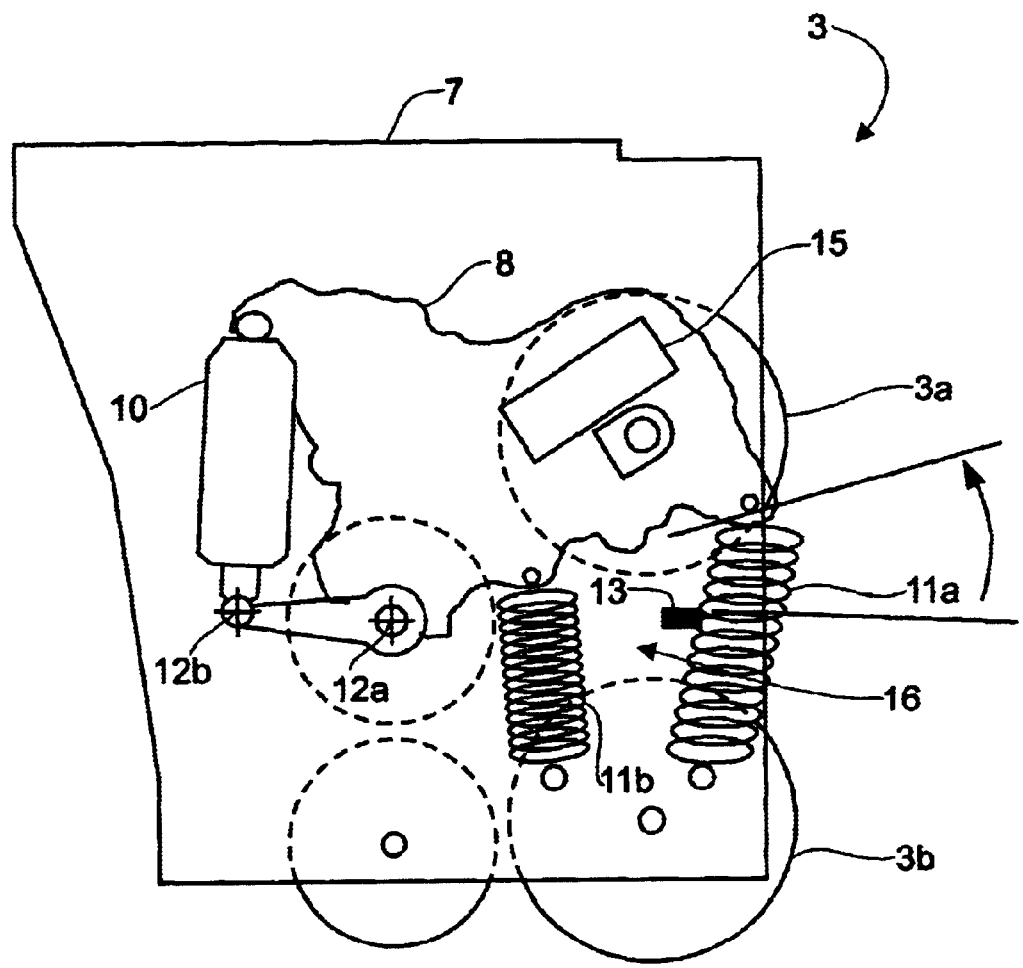
FIG. 3 is a side view of the feed roll housing with the upper front feed roll in the highest vertical position.

Having reference to FIGS. 2 and 3, one embodiment of the invention is shown mounted on a typical feed mechanism of a Jaguar forage harvester, made by Claas KGaA of Harsewinkel, Germany. The feed mechanism's upper feed roll 3a will oscillate between "resting" and "displaced" positions, relative to the lower feed roll 3b, in response to changing crop densities during normal harvesting operations.

FIG. 2 shows the feed mechanism 3 in the "resting" position. The feed mechanism 3 includes a housing 7 with counter-rotating upper 3a and lower 3b feed rolls and counter-rotating upper 4a and lower 4b compression rolls. The upper feed roll 3a is attached to a displaceable frame formed by the gear box 8. In other harvesters the displaceable frame may be formed by a beam and pulley. The shaft of the upper feed roll 3a is secured in place by a wedge bolt 14. The lower roll 3b rotates about a shaft rotatably mounted to the housing 7. The gear box 8 is pivotally mounted to the housing 7 via a pivot arm 9 at points 12a and 12b and is dampened by a shock absorber 10. The gear box 8 is fully floating and pivots around pivot points 12a, 12b.

In the "resting" position the upper feed roll 3a is in a lower-most position relative to the lower feed roll 3b, forming a nip 16, while the gear box 8 rests against a rubber stop 13 attached to the housing 7. Springs 11a, 11b extend between the housing 7 and the gear box 8 so as to apply a force to the gear box 8 biasing the upper feed roll 3a to the resting position and gripping the crop.

FIG. 3 shows the feed mechanism 3 in the "displaced" position, as would be the case when a thick mat of crop, rock or other substantially non-compressible object (not shown) passes through the nip 16 between the two feed rolls 3a, 3b. The thick mat of crop or foreign object exerts a force on the upper feed roll 3a, causing the attached gear box 8 to pivot around pivot point 12a and off of the rubber stop 13, compressing the shock absorber 10 and stretching the springs 11a, 11b.

In the Jaguar forage harvester embodiment shown in FIGS. 2 and 3 the resultant space between the gear box 8 and the rubber stop 13 may be as much as 4 inches when in the "upper" position. The upper compression roll 4a is also displaceable relative to the lower compression roll 4b, but to a lesser extent than the upper feed roll 3a.

The upper feed roll 3a is displaced upwards slowly in response to increasing crop thickness, or upwards quickly in response to a non-compressible foreign object embedded within the crop. To measure the acceleration of the displacement of the upper feed roll 3a, an inertial sensor 15 is mounted on the fully-floating gear box 8 on top of and adjacent to the wedge bolt 14. As the upper feed roll 3a is displaced, the gear box 8, which forms a frame around the upper feed roll 3a, and hence the sensor 15 are also displaced.

Figure 4A:
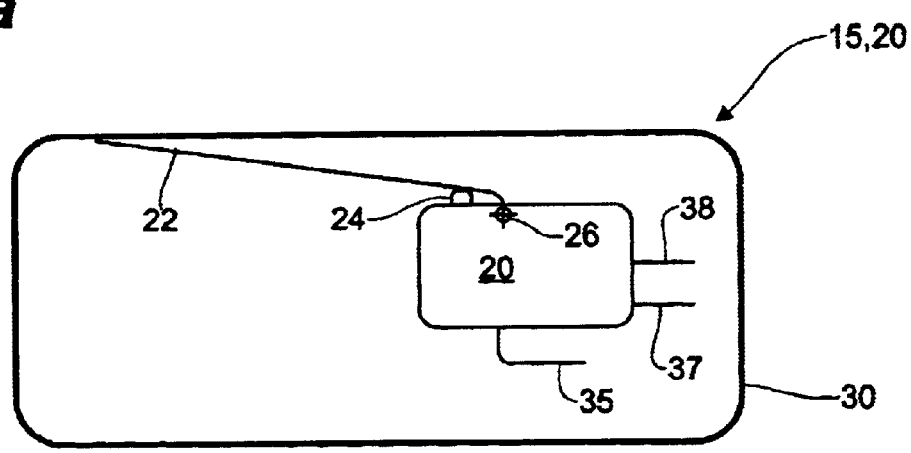
FIGS. 4a and 4b are side views of the sensor in the normal and triggered states respectively.
Figure 4B:
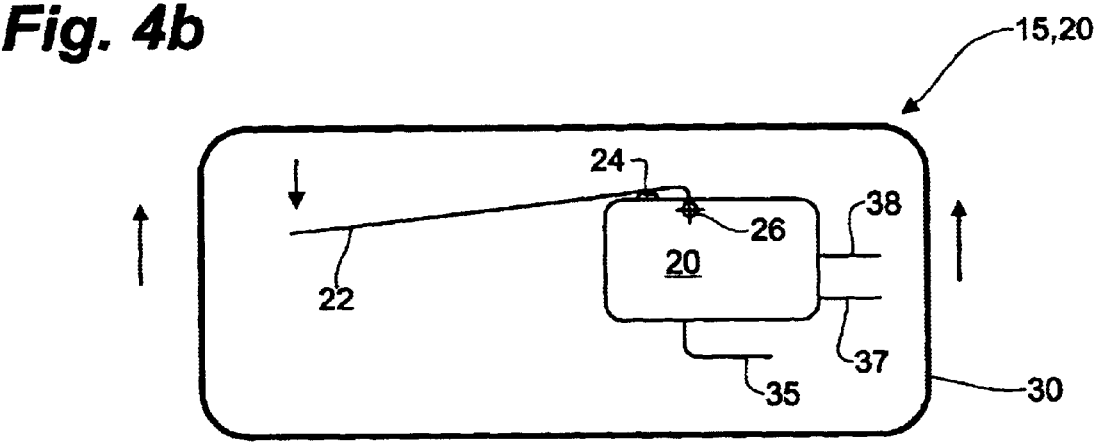

Having reference to FIGS. 4a and 4b, in one embodiment, a sensor 15 is provided comprising a microswitch 20 with an inertially activated lever 22 resting on an actuating plunger 24 and pivotally connected at a pivot point 26 inside the microswitch 20, all of which is enclosed in a sensor case 30. A suitable sensor 15 can be constructed using a Cherry brand microswitch, available at Princess Auto Ltd., Winnipeg, Manitoba, part number 0700190, and a Hammond 1590A diecast aluminum alloy box made by Hammond Mfg. Co. Ltd. Guelph, Ontario.

Such a microswitch sensor is a binary sensor capable only of emitting a signal corresponding to either an ON or an OFF signal depending on whether the microswitch is in a closed or an open circuit position.

In combination, the sensor 15 which is mounted to a displaceable roll (say upper feed roll 3a), form a foreign object detector, the quick displacement of the roll in response to a foreign object causing the sensor 15 to accelerate above a preset threshold and to emit a signal which can be interpreted as being indicative of the presence of a foreign object.

In FIG. 4a the sensor 15 is shown in a non-triggered state with the microswitch 20 mounted inside the sensor case 30 such that the actuating plunger 24 pushes the lever 22 gently up against the inside roof of the sensor case 30 by virtue of the actuating plunger's internal spring (not shown) inside the microswitch 20. The gentle contact between the end of the lever 22 and the inside roof portion of the sensor case 30 dampens any unwanted free play or vibration. In this embodiment the microswitch 20 has a common terminal 35, a normally open terminal 37 and a normally closed terminal 38.

Having reference to FIGS. 3 and 4b, when the upper feed roll 3a is displaced upwards quickly, in response to a substantially non-compressible object embedded within the crop, the gear box 8 and attached sensor 15 are likewise displaced upwards quickly. Due to the inertia present in the lever 22, and the fact that it pivots around the pivot point 26, the lever 22 will momentarily lag behind the upward displacement of the microswitch 20 and sensor case 30. If the upper feed roll 3a, the gear box 8 and the sensor 15 displace up quickly enough, and exceed a threshold acceleration, then the movement of the lever 22 overcomes the force of an internal spring (not shown) in the microswitch and depresses the plunger 24, actuating the microswitch 20 briefly. The activation of the microswitch 20 will, through additional circuitry described below, emitting a signal and shutting down the feed mechanism 3 so as to prevent the non-compressible foreign object from being fed further into the harvester. The feed mechanism can be stopped or shut down through means such as merely by shutting off the drive to the gear box 8 or through some other emergency clutch and brake system (not shown).

The acceleration threshold or sensitivity of the sensor 15 can be adjusted by substituting different levers 22, these being either lighter, heavier, longer or shorter than the previous lever 22. A lighter or shorter lever 22 would be less sensitive to upward displacement than a heavier or longer lever 22. Other sensors 15 can be substituted for the microswitch 20 including accelerometers associated with the appropriate electronics. Such a sensor 15 is an analog sensor capable of emitting a range of signals on a continuum depending upon the magnitude of the sensed acceleration.

In another embodiment (not shown) two or greater numbers of microswitches 20 can be mounted inside the sensor case 30, each with levers 22 calibrated for actuation at different acceleration levels. Any one of the microswitches 20 could trigger the shutdown of the feed mechanism 3. Switching circuitry (not shown) can then be provided to switch between the various microswitches 20 and thus allow for easy selection of sensor sensitivity by the harvester operator depending on crop conditions and feed roll speed.

FIGS. 5a and 5b illustrate another method of adjusting sensor sensitivity and, as a result, acceleration threshold. In FIG. 5a the actuating lever 22 of the microswitch 20, of the embodiment shown in FIGS. 4a and 4b, is mounted almost horizontal relative to the gear box 8. This orientation results in the sensor 15 being more sensitive than compared to the more vertical orientation of the sensor 15 shown in FIG. 5b. The more vertical orientation reduces the moment of the actuating lever's center of gravity about its pivot 26.

Figure 6A:
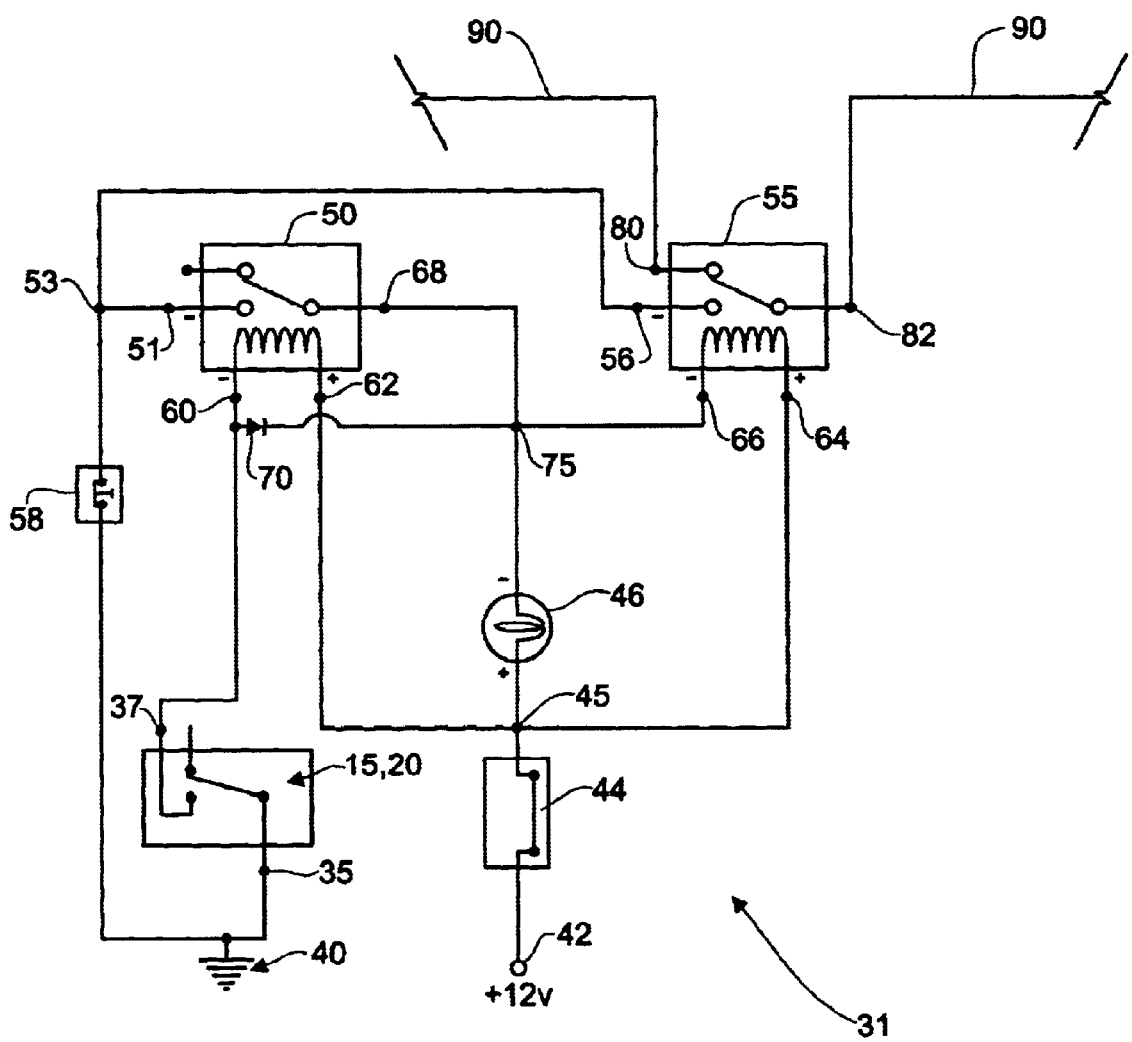
FIGS. 6a and 6b are electrical schematics of one embodiment of the circuitry for the sensor in the normal and triggered states respectively.

FIG. 6a shows an electrical schematic of one embodiment of the circuitry 31 for the sensor 15 in the normal, non-triggered, state. Power is supplied to the circuit 31 via a ground connection 40 from the chassis of the harvesting machine and a 12 volt positive power source 42.

A main on/off switch 44 connects the 12 volt positive power source 42, via junction 45, to an indicator lamp 46 and the positive terminals 62, 64 of the coil in the two relays 50, 55 respectively. The normally-open terminals 51, 56 of the two relays 50, 55 are connected, via junction 53, to a normally-closed push button switch 58, which in turn is connected to the ground 40. The common terminal 35 is connected to the ground 40. The normally open terminal 37 is connected to the negative terminal 60 of the first relay 50 and to a diode 70.

The common terminal 68 of the first relay 50 is connected, via a junction 75, to the diode 70, the indicator lamp 46, and the negative terminal 66 of the coil in the second relay 55. The normally closed terminal 80, and common terminal 82, of the second relay 55 are connected in line to the sensing circuit 90 of the metal detector (not shown) installed in the harvester. The pre-existing metal detector has additional circuitry means to stop the feed mechanism 3. By tying the sensor circuit in series into the pre-existing metal detector circuitry, via the sensing circuit 90, the overall cost of the foreign object detector is minimized and at the same time is easily retrofitted into existing forage harvesters.

In the normal, non-triggered, state the sensor's 15 normally open terminal 37 remains disconnected and thus the negative terminal 60 of the first relay 50 remains uncharged and the relay 50 unenergized. Likewise, the normally-open terminal 51 of the first relay 50 remains disconnected from the diode 70, the negative terminal 66 of the second relay 55 and from the indicator lamp 46, and therefore all are denied a connection to the ground 40. This leaves the second relay 55 also unenergized and, through the normally closed terminal 80, permits current to flow uninterrupted through the sensing circuit 90 of the metal detector. In the preferred circuit, interruption of the flow of current is a signal to shut down the feed rolls 3a, 3b.

Figure 6B:
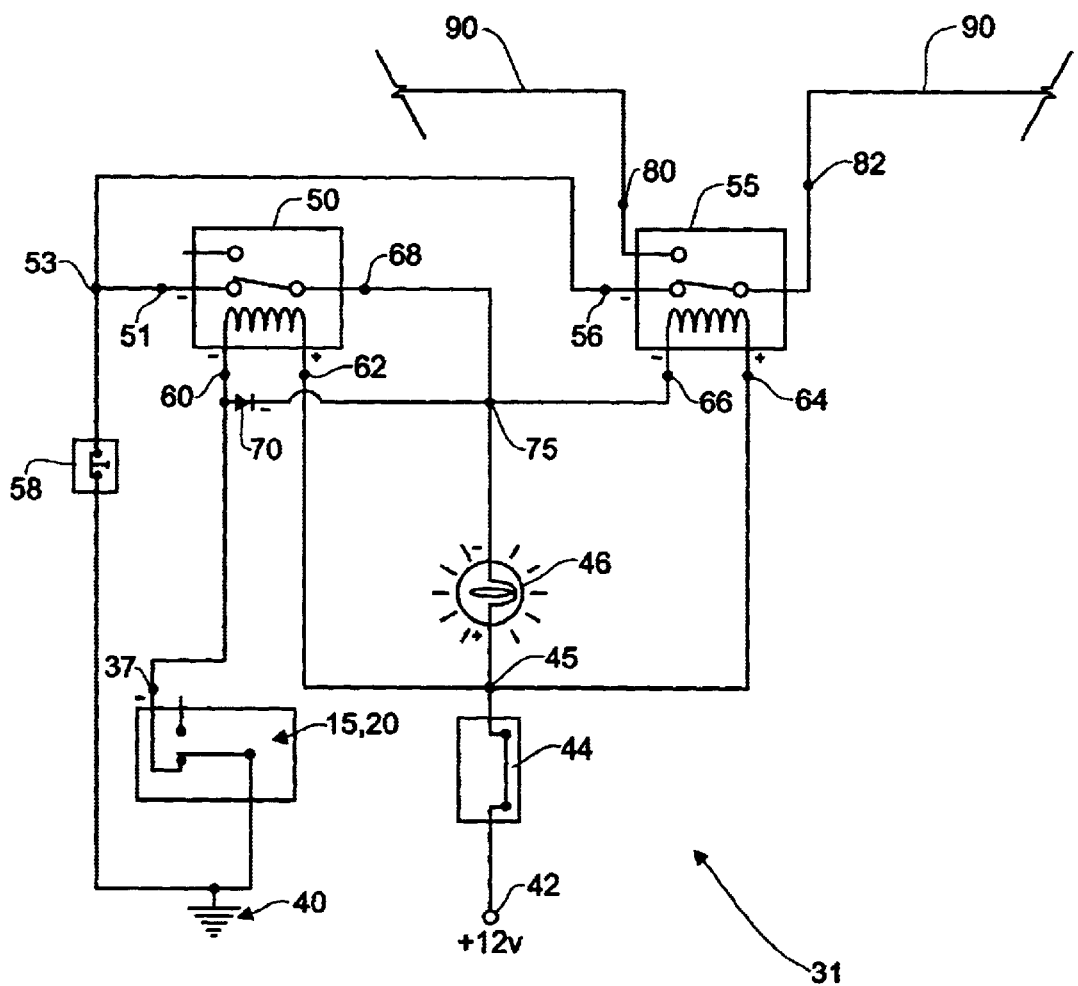

FIG. 6b shows the electrical schematic of circuitry 31 for the sensor 15 in the triggered state. Power is supplied to the circuit 31 via a ground connection 40 from the chassis of the harvesting machine and a 12 volt positive power source 42.

When the sensor 15 is triggered by an object going through the feed rolls 3a,3b, a signal is emitted to shut down the rolls. The normally open terminal 37 briefly connects the ground 40 to the negative terminal 60 of the first relay 50 thereby energizing it. Likewise the normally-open terminal 51 of the first relay 50 is now connected to the diode 70, to the negative terminal 66 of the second relay 55, and to the indicator lamp 46, and therefore are all provided a connection to the ground 40. Since the diode 70 is now connected to the ground 40, it provides another path for the negative terminal 60 of the first relay 50 to the ground 40 through junction 75 thus latching the relays 50, 55 in a self holding state. The indicator lamp 46 is now lit, and the second relay 55 is energized. Once energized, the second relay 55 interrupts the current in the sensing circuit 90 of the metal detector causing its circuitry means (not shown) to stop the feed roll mechanism. Other embodiments of the sensor circuit 31 could stop the feed roll mechanism directly, without tying into pre-existing metal detector circuitry.

The entire circuit 31 can be reset by depressing the normally-closed push button switch 58 which cuts off the ground 40 to the two relays 50, 55, unlatching the relays 50, 55, and restoring the circuit 31 to a normal state as shown in FIG. 6a.

Figure 7:
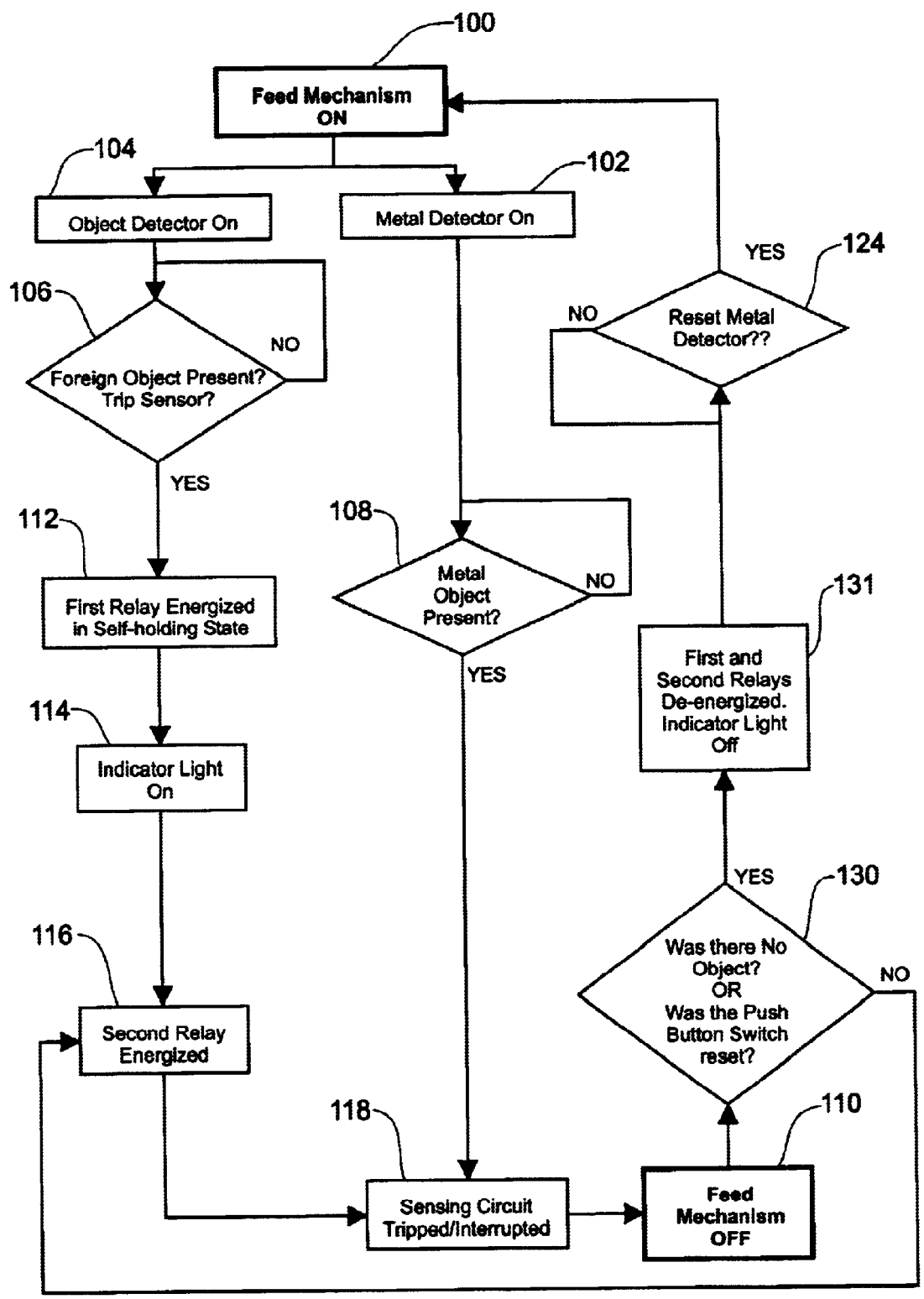
FIG. 7 is a flowchart illustrating the integration between the embodiment of the sensor circuitry of FIGS. 6a and 6b and a metal detector present in a Claas harvester.

FIG. 7 is a flowchart outlining the preferred integration between the embodiment of the sensor circuitry of FIGS. 6a and 6b and a metal detector which is typically already present in a Claas harvester. Once the feed mechanism is activated 100, the metal detector and object detector work 102, 104 independently from each other, continuously sensing for either metal or foreign objects. Once the metal detector's magnet senses 108 that a metal object is present in the feed mechanism, a signal is emitted, tripping 118 the sensing circuit and cause the feed mechanism to stop 110.

Once the foreign object detector of the present invention detects 106 a foreign object a first relay is energized 112 in a self-holding state. The first relay will then also turn on 114 an indicator light and energize 116 a second relay. The second relay, once energized 116, a signal is emitted, interrupting 118 the magnetic sensing circuit and thus simulate that a metal object is present in the feed mechanism and causing it to stop 110.

As the first relay is in a self-holding state 112, the indicator light remains on 114 (alerting the operator that it was the foreign object detector that was tripped rather than the metal detector) and the second relay remains energized 116 until the entire circuit is reset 130 via a push button switch. The self-holding state 112 also ensures that a brief triggering 106 of the sensor by a foreign object, which alone may not be sufficient to trip the metal detector circuitry, will indeed interrupt 118 the circuit of the magnetic sensing circuit and cause the feed mechanism to stop 110.

Depending on whether a foreign or metal object triggered 106, 108 the respective detector, the steps for resetting the circuits are slightly different. If there was no foreign object present 130 then the object detector would not have been triggered, its first and second relays would remain off 131, and only the metal detector circuit has to be reset 124. However, if a foreign object triggered the foreign object detector, then first the foreign object detector circuitry has to be reset 130 by depressing the push button switch, which in turn de-energizes 131 the first and second relays. Then the metal detector circuitry can be reset 124.

Figure 8A:
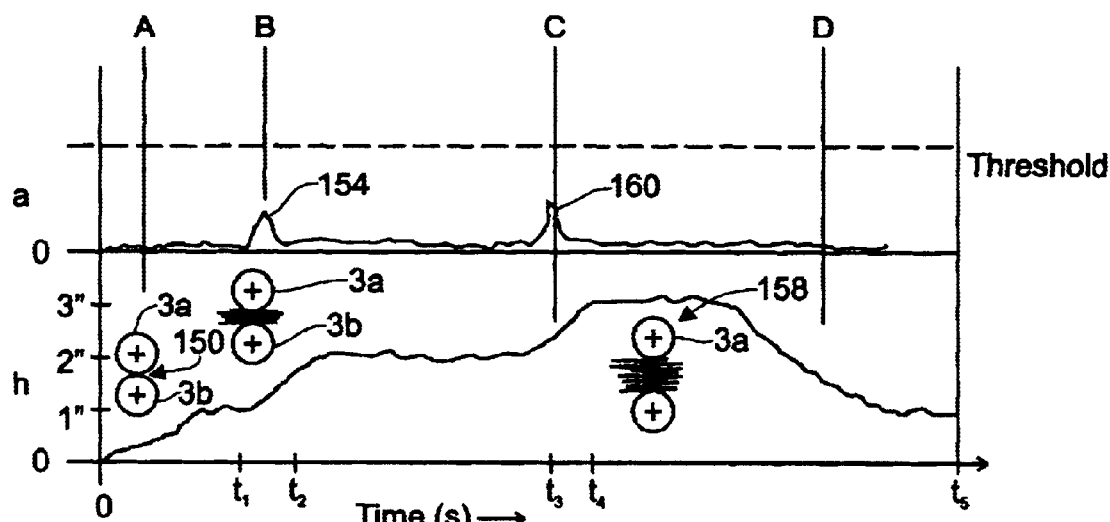
FIGS. 8a and 8b are graphs which illustrate a change in feed roll height and acceleration over time in response to changing crop density and in response to foreign objects respectively.
Figure 8B:
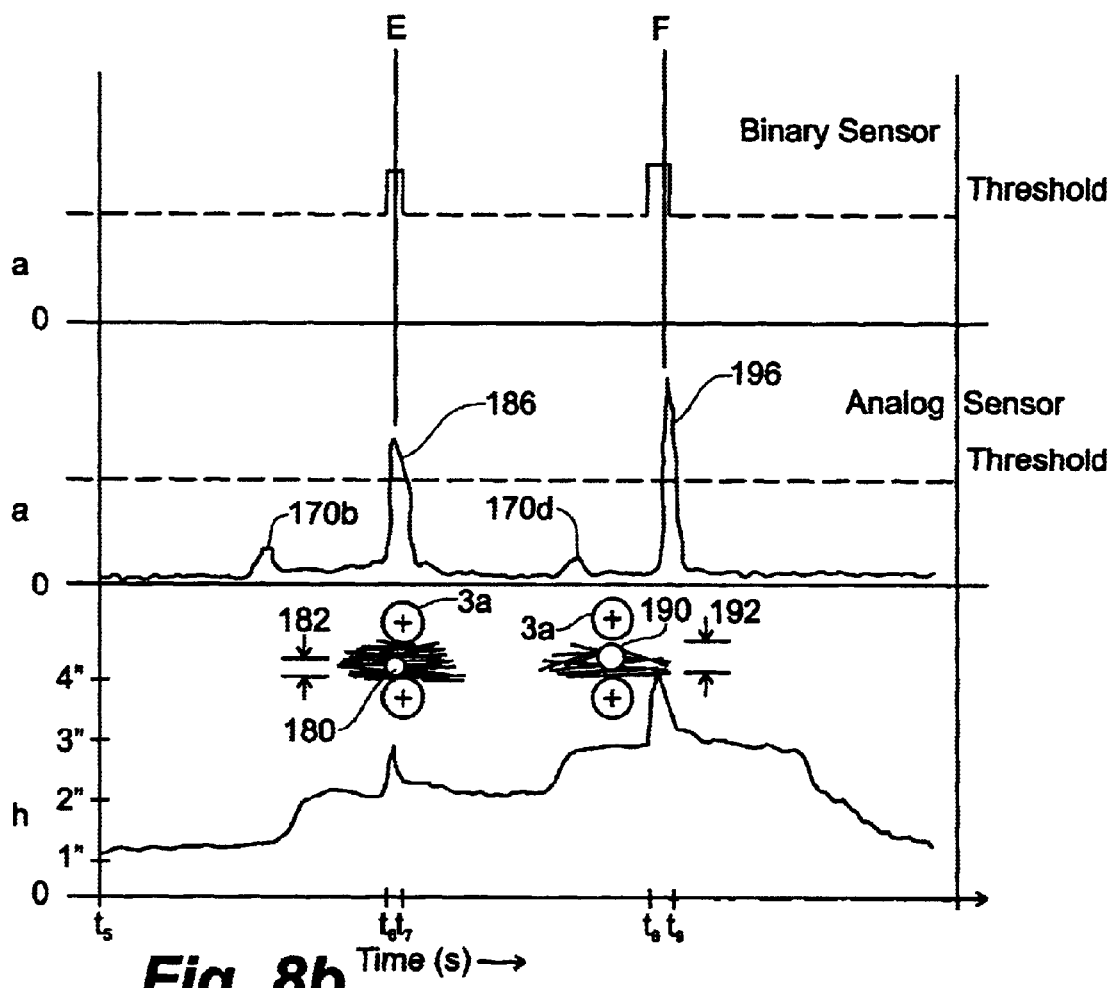

FIGS. 8a and 8b graphically illustrate the change height (h) and acceleration (a) over time of the upper feed roll 3a, of the embodiment shown in FIGS. 2 and 3, in response to changing crop densities and foreign objects, respectively.

Referring to FIG. 8a, when a harvester first starts up at A, and there is no crop mat between the feed rolls 3a, 3b, the upper feed roll 3a is in a lowermost "resting" position 150 in relation to the lower feed roll 3b. At B, as the harvesting process commences, the header presents crop material from the field to the feed mechanism 3 and the upper feed roll 3a displaces upwards relative to the lower feed roll 3b, experiencing only a slight positive acceleration 154 between time $t_1$ and $t_2$. If an analog sensor is used, it can emit a signal proportional to the sensed acceleration. If a binary sensor is used, such as a microswitch 20, then only accelerations exceeding a certain threshold are sensed (See FIG. 8b).

At C, should a thicker mat of crop material be fed through the feed mechanism 3 later on in the harvesting process, the upper feed roll 3a displace upwards even further 158 however, only causing another slight positive acceleration 160 between time $t_3$ and $t_4$. Since the upper feed roll 3a is displaced gradually over various periods of time $t_1$–$t_4$, in response to the change in crop density during the harvesting process, the upper feed roll 3a experiences only a slight positive acceleration 154, 160. As the crop density once again gradually decreases at D the upper feed roll displaces downwardly closer to the resting position similar to that shown at A.

Turning to FIG. 8b, neither of the slight positive accelerations 170b, 170d, which are experienced by the upper feed roll 3a during a crop density change, are sufficient to a threshold acceleration set for either an analog sensor or binary sensor and therefore the normal harvesting operation so not trigger the sensor 20 in the foreign object detector. An analog sensor can comprise an accelerometer with additional circuitry for filtering out the slight positive accelerations 170b, 170d resulting from normal operations. Preferably an analog circuit further comprises means such as a comparator circuit for sensing when first signals emitted from the sensor exceed a predetermined threshold acceleration and then emitting an additional or second signal indicative thereof which is used to shut down the feed mechanism. A stated earlier, the binary sensor can be a microswitch as described for FIGS. 4a and 4b.

At E, should a rock 180 embedded in the crop mat be forced through the feed rolls, the upper feed roll 3a will experience a rapid upward displacement 182 over a short period of time $t_6$–$t_7$ and hence a much greater positive acceleration 186 than that experienced during normal operations 170b, 170d. At F, an even larger rock 190 embedded in the crop mat will likewise cause the upper feed roll 3a to experience a rapid upward displacement 192 over a short period of time $t_8$–$t_9$ and a large positive acceleration 196. The large positive accelerations 186, 196 experienced by the upper feed roll 3a exceed the preset threshold and cause the sensor 20 to trigger the shut-down circuitry of the foreign object detector and stop the feed mechanism 3.

The embodiments of the invention in which an exclusive property or privilege is being claimed are defined as follows:

1. Apparatus for detecting the presence of a substantially non-compressible foreign object between contra-rotating, substantially parallel and opposing rotating rolls, the apparatus comprising:

a first rotating rolls, rotatable on a shaft supported by a frame;

a second rotating roll which is displaceable relative to the first roll for adjusting the spacing therebetween; and wherein the first and second contra-rotating rolls are oriented one above the other;

microswitch, mounted for displacement with the second rotating roll, and having an inertially activated lever pivotally mounted for actuating the microswitch at a predetermined level of acceleration for emitting a signal when said acceleration of the second rotating roll and microswitch exceeds a predetermined level of acceleration said signal being indicative of the presence of a foreign object between the first and second rolls; and means for stopping the rotation of at least one of the first and second rolls upon said signal indicating the presence of a foreign object between the first and second rolls.

2. The apparatus of claim 1 wherein the contra-rotating rolls comprise upper and lower feed rolls of a harvester, the upper feed roll being displaceable relative to the lower feed roll and the microswitch being mounted for displacement with the upper feed roll.

3. The apparatus of claim 1 further comprising two or more microswitches, each of the two or more microswitches having an inertial levers which is actuable at one or more a predetermined level of acceleration.

4. The apparatus of claim 1 further comprising:
a first microswitch having an inertial lever which is calibrated for actuation at a first level of acceleration;
at least a second microswitch, having an inertial lever which is calibrated for actuation at a second or higher thresholds of acceleration; and
means for selecting between the first and at least the second microswitches as being the microswitch which is indicative of the presence of a foreign object.

5. The apparatus of claim 1 wherein the means for stopping the rotation of one of the first and second rolls, is a circuit wherein, when the signal indicates the presence of a foreign object between the feed rolls, the signal switches a state of the circuit.

6. The apparatus as described in claim 4 wherein a sensitivity of the microswitch is altered by adjusting one of either a length or a weight of the inertially actuated lever.

7. The apparatus as described in claim 4 wherein a sensitivity of the microswitch is altered by orienting the inertially activated lever relative to horizontal.

* * * * *